(12) United States Patent
Nagasawa (10) Patent No.: US 10,814,816 B2
(45) Date of Patent: Oct. 27, 2020

(54) PASSENGER PROTECTION APPARATUS (71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 138 days.

(21) Appl. No.: 16/239,818

(22) Filed: Jan. 4, 2019

(65) Prior Publication Data

US 2019/0299896 A1 Oct. 3, 2019

(30) Foreign Application Priority Data

Mar. 30, 2018 (JP) ................................ 2018-068548

(51) Int. Cl.
*B60R 21/015* (2006.01)
*B60R 22/26* (2006.01)
(Continued)

(52) U.S. Cl.
CPC ...... *B60R 21/01512* (2014.10); *B60R 21/013* (2013.01); *B60R 22/26* (2013.01);
(Continued)

(58) Field of Classification Search
CPC ... B60R 21/18; B60R 25/257; B60R 21/0136; B60R 21/2035; B60R 21/0154;
(Continued)

(56) References Cited

U.S. PATENT DOCUMENTS 6,356,200 B1 * 3/2002 Hamada ................. B60N 2/002
177/144
6,559,555 B1 * 5/2003 Saitou .................... B60N 2/002
280/735

(Continued)

FOREIGN PATENT DOCUMENTS

JP H10-152019 A 6/1998
JP H11-020613 A 1/1999
(Continued)

OTHER PUBLICATIONS

Japanese Office Action dated Sep. 10, 2019 for Japanese Patent Application No. 2018-06854 (5 pages in Japanese with English Translation).

*Primary Examiner* — Behrang Badii
(74) *Attorney, Agent, or Firm* — Smith, Gambrell & Russell, LLP (57) ABSTRACT

A passenger protection apparatus includes: a seat belt including a shoulder belt ; an anchor disposed on one side of a seat to hold one end of the seat belt; a buckle disposed on the other side; a tongue that can hold part of the seat belt; a first activation member that reels and unreels the shoulder belt; a first detector that detects or predicts a collision of the vehicle; a second detector that detects a change in a sitting state of the passenger; and a controller that controls activation of the first activation member. When the first detector detects or predicts a collision of the vehicle, the controller controls the first activation member to reel, and stop reeling or unreel the shoulder belt. The controller controls the first activation member to reel the shoulder belt again, based on the change in the sitting state detected by the second detector.

8 Claims, 5 Drawing Sheets

(51) Int. Cl.
  *B60R 22/46* (2006.01)
  *B60R 21/013* (2006.01)
  *B60N 2/20* (2006.01)
  *B60R 22/18* (2006.01)
  *B60R 21/01* (2006.01)
  *B60R 21/18* (2006.01)

(52) U.S. Cl.
  CPC ............ *B60R 22/46* (2013.01); *B60N 2/20* (2013.01); *B60R 21/18* (2013.01); *B60R 2021/01286* (2013.01); *B60R 2022/1806* (2013.01)

(58) Field of Classification Search
  CPC .......... B60R 21/0132; B60R 21/01532; B60R 22/48; B60R 21/01512; B60R 21/231; B60R 21/205; B60R 21/2338; B60R 21/2032; B60R 21/203; B60R 21/01516; B60R 21/0152; B60R 21/013; B60R 21/01; B60R 22/4628; B60R 21/0155; B60R 21/0134; B60R 21/01548; B60R 21/01542; B60R 22/26; B60R 22/46; B60R 2021/01286; B60R 2022/1806; B60N 2/002; B60N 2/0732; B60N 2/20; H04M 1/72577; H04M 1/72522; H04M 1/72569; G06F 21/32; B62D 1/197; H04W 4/48; G06K 9/0053; G06K 9/00838; H04N 5/23218
  See application file for complete search history.

(56) References Cited

U.S. PATENT DOCUMENTS

| | | | | |
|---|---|---|---|---|
| 8,596,677 | B2* | 12/2013 | Burczyk | B60R 21/18 280/733 |
| 10,173,622 | B2* | 1/2019 | Nagasawa | B60R 21/0132 |
| 10,668,892 | B2* | 6/2020 | Rumler | B60N 2/688 |
| 2006/0012159 | A1* | 1/2006 | Kore | B60R 21/18 280/733 |
| 2007/0257474 | A1* | 11/2007 | Eschbach | B60R 21/01516 280/735 |
| 2011/0241318 | A1* | 10/2011 | Miyajima | B60N 2/002 280/730.1 |

FOREIGN PATENT DOCUMENTS

| | | |
|---|---|---|
| JP | 2005-075269 A | 3/2005 |
| JP | 2007-160986 A | 6/2007 |
| JP | 2015-112911 A | 5/2015 |
| JP | 2017-170993 A | 8/2017 |

* cited by examiner

PASSENGER PROTECTION APPARATUS

The present application claims priority from Japanese Patent Application No. 2018-068548 filed on Mar. 30, 2018, the entire contents of which are hereby incorporated by reference.

BACKGROUND

1. Technical Field

The present invention relates to a passenger protection apparatus.

2. Related Art

As a passenger protection apparatus for correcting the posture of a passenger to improve the passenger protection function, there has been known a passenger protection apparatus including a seat belt device configured to correct the sitting posture of a passenger by controlling the take-up amount of the belt of the seat belt device in multiple stages depending on the condition of the vehicle, a collision of the vehicle and the sitting posture of the passenger, which is disclosed, for example, in Japanese Unexamined Patent Application Publication (JP-A) No. 2005-075269.

SUMMARY OF THE INVENTION

An aspect of the present invention provides a passenger protection apparatus including seat belt, an anchor, a buckle, a tongue, a first activation member, a first detector, a second detector, and a controller. The seat belt includes a shoulder belt capable of restraining a shoulder of a passenger. The anchor is disposed on one side of a seat in a seat width direction and configured to hold one end of the seat belt. The buckle is disposed on the other side of the seat in the seat width direction. The tongue is capable of holding part of the seat belt extending from the anchor. The tongue is engaged with the buckle. The first activation member is configured to reel and unreel the shoulder belt. The first detector is configured to detect or predict a collision of the vehicle. The second detector is configured to detect a change in a sitting state of the passenger.

The controller is configured to control activation of the first activation member. When the first detector detects or predicts a collision of the vehicle, the controller controls the first activation member to reel, and stop reeling or unreel the shoulder belt. The controller controls the first activation member to reel the shoulder belt again, on a basis of the change in the sitting state detected by the second detector.

DETAILED DESCRIPTION

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description. For the above-described passenger protection apparatus, it is not expected that the freedom of the sitting state of the passenger is significantly increased in an automated driving vehicle, compared to a manual driving vehicle. Therefore, it might not be possible to respond to a change in the sitting state of the passenger during automated driving.

It is desirable to provide a passenger protection apparatus capable of preventing the lower body of the passenger from moving forward even though the passenger P sits in any postures, and therefore to prevent the passenger from being placed in a sitting state which makes it difficult to absorb the impact of a collision by airbags.

Figure 1A:
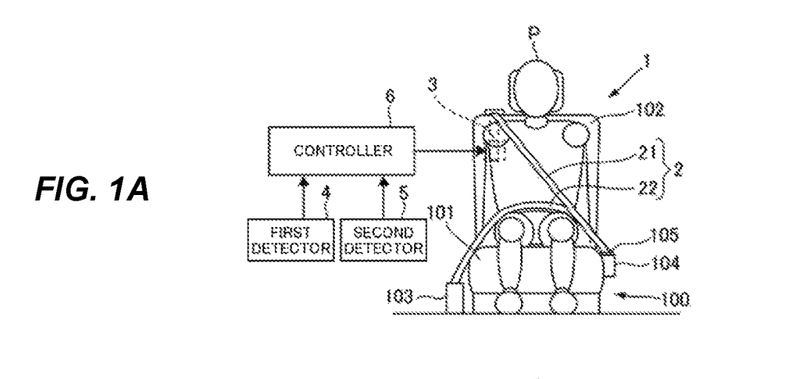
FIG. 1A is a front view schematically illustrating a passenger protection apparatus according to an example of the present invention.
Figure 1B:
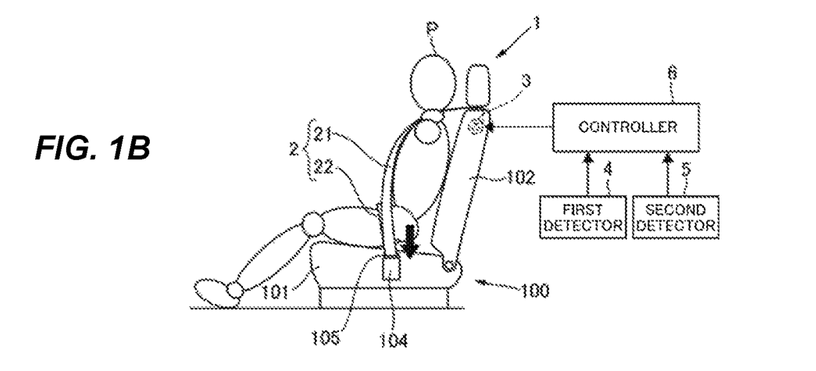
FIG. 1B is a side view schematically illustrating the passenger protection apparatus.
Figure 1C:
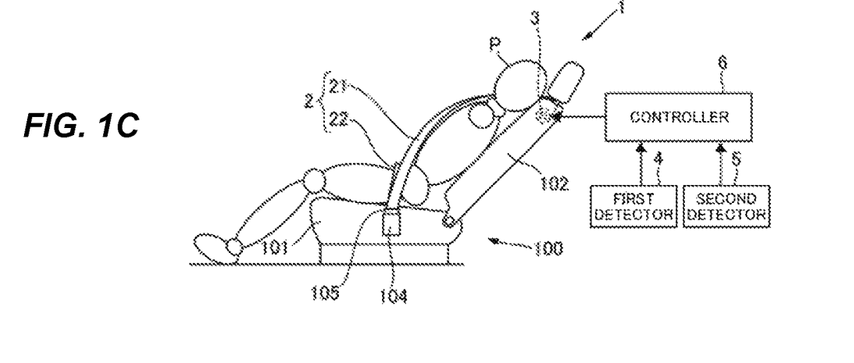
FIG. 1C is a side view schematically illustrating the passenger protection apparatus when a seat reclines.
Figure 2:
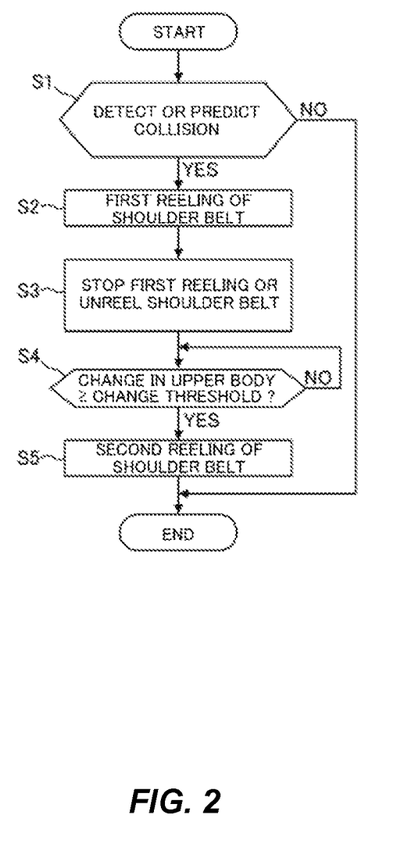
FIG. 2 is a flowchart illustrating a control process to regulate the sitting state of a passenger by using the passenger protection apparatus illustrated in FIGS. 1A-1C.

FIG. 1A is a front view schematically illustrating a passenger protection apparatus 1 according to an example of the present invention. FIG. 1B is a side view schematically illustrating the passenger protection apparatus 1. FIG. 1C is a side view schematically illustrating the passenger protection apparatus 1 when a seat 100 reclines. FIG. 2 is a flow chart illustrating a control process to regulate the sitting state of a passenger by using the passenger protection apparatus 1 illustrated in FIGS. 1A-1C. FIGS. 3A-3D illustrate the passenger protection apparatus 1 activated according to the control process illustrated in FIG. 2.

As illustrated in FIGS. 1A-1C, the passenger protection apparatus 1 includes the seat 100, a seat belt 2, a first activation member 3, a first detector 4, a second detector 5, and a controller 6.

The seat 100 includes a seat cushion 101 on which a passenger P can sit, and a seat back 102 on which the passenger P can lean back. The seat back 102 turns around the axis of a hinge member disposed in the rear part of the seat cushion 101 along the width direction of the seat 100 (hereinafter "seat width direction"), so that the seat 100 can recline.

The passenger protection apparatus 1 includes an anchor 103 on the floor and a buckle 104 provided on a side surface of the seat 100. The anchor 103 is disposed on the floor of the vehicle, on one side (the right side in FIGS. 1A-1C) of the seat 100 in the seat width direction, and configured to fixedly hold one end of the seat belt 2. Here, the anchor 103 may be attached directly to the seat 100 but not provided on the floor, if the seat layout of the automated driving vehicle will be more freely designed in the future. The buckle 104 is provided on the side surface of the lower part of the seat 100 on the other side (left side in FIGS. 1A-1C) of the seat 100 in the seat width direction. A tongue 105 configured to be able to hold part of the seat belt 2 extending from the anchor 103 is engaged with the buckle 104. The tongue 105 is detachably attached to the buckle 104, and allows the seat belt 2 to slide therethrough. The seat belt 2 extends from the upper part of the seat back 102 to the anchor 103 through the tongue 105 engaged with the buckle 104.

The seat belt 2 is configured to restrain the passenger P sitting on the seat 100, and includes a shoulder belt 21 and a wrap belt 22. As described above, one end of the seat belt 2 is fixedly held by the anchor 103, and the other end is held by the first activation member 3. The shoulder belt 21 is configured to be able to restrain the shoulder of the passenger P. The shoulder belt 21 constitutes part of the seat belt 2, and, with the present example, the shoulder belt 21 extends obliquely downward from a position in the right side in which the anchor 103 is provided, to the tongue 105 engaged with the buckle 104 in the seat width direction. The shoulder belt 21 is provided to extend obliquely downward across the upper body of the passenger P to tightly hold the passenger P from the shoulder in one side to the lumbar part in the other side of the passenger P in the seat width direction. The wrap belt 22 is configured to be able to restrain the lumbar part of the passenger P. The wrap belt 22 constitutes part of the seat belt 2, and extends from the anchor 103 to the tongue 105 engaged with the buckle 104. The wrap belt 22 is provided to extend across the lumbar part of the passenger P from one end to the other in the seat width direction to tightly hold the lumbar part and the legs of the passenger P.

The first activation member 3 is configured to reel and unreel the shoulder belt 21. To be more specific, the first activation member 3 is disposed in the upper part of the seat back 102, and configured to reel the shoulder belt 21 to increase the restraining force, and to unreel the shoulder belt 21 to reduce the restraining force by using, for example, a retractor rotationally driven by gas or electricity. With the present example, the shoulder belt 21 of the seat belt 2 is guided into the seat back 102 from the upper end of the seat back 102, and held by the first activation member 3 in the seat back 102.

The first detector 4 detects or predicts a collision of the vehicle. To be more specific, the first detector 4 detects or predicts a collision of the own vehicle with another vehicle or an obstacle, based on the monitoring result of the surrounding environment of the vehicle by a camera or a sensor. The first detector 4 can output the detection result to the controller 6. The first detector 4 can determine an occurrence of a collision based on the detection of an impact on the own vehicle by, for example, an in-vehicle acceleration sensor. As for the prediction of a collision, it is possible to determine whether there is a high or low possibility of a collision by: deriving a possibility that another vehicle or an obstacle approaches or contacts the own vehicle based on the result of monitoring another vehicle or the obstacle by an in-vehicle camera or a monitoring sensor and the running speed and direction of the vehicle; and determining whether the derived result exceeds a predetermined threshold. The first detector 4 may be realized by a combination of a processing unit to analyze the monitoring results and, for example, an in-vehicle camera, a monitoring sensor, or an acceleration sensor.

The second detector 5 detects a change in the sitting state of the passenger P sitting on the seat cushion 101. To be more specific, the second detector 5 with a camera or a sensor detects a change in at least one of the sitting position and the sitting posture of the passenger P. The second detector 5 can output the detection result to the controller 6. It is possible to correctly detect the sitting position or posture of the passenger P by using a driver monitoring system (DMS) with a camera to monitor the passenger P, a pressure sensitive sensor disposed on the surfaces of the seat cushion 101 and the seat back 102 to derive the weight distribution, and an angle sensor to detect the reclining angle of the seat back 102. The change in the sitting position or sitting posture of the passenger P may be obtained by a combination of a processing unit to analyze the monitoring results and the above-described camera or sensor.

Here, although a change in the sitting state is detected by the second detector 5, this is by no means limiting. A change in the sitting state may be estimated, instead of the direct monitoring by using a camera or a sensor as described above. In this case, for example, an elapsed time from the occurrence of a collision detected by an acceleration sensor is measured by a timer, and after a predetermined period of time has elapsed, it is estimated that the sitting state of the passenger P is changed to a predetermined state. Here, it is preferred that the correlation between an acceleration of the vehicle and a change in the passenger P, in particular, a change in the upper body (for example, sitting-up behavior and forward movement) is previously stored in a processing unit for estimation.

The second detector 5 may detect, for example, the maximally weighted position of the seat cushion 101 as the sitting position of the passenger P. In the usual sitting position, mostly the lower back (lumbar) or the hip of the passenger P contacts the seat cushion 101 as indicated by a black down-pointing arrow illustrated in FIG. 1B. The passenger P illustrated in FIGS. 1A-1C sits in an appropriate position which is expected to protect the passenger P by in-vehicle passenger protection devices, such as a front airbag, side airbags, a curtain airbag, the seat belt 2. The second detector 5 may detect, for example, the sitting position more forward than the position illustrated FIGS. 1A-1C, where the lumbar part or the lower back is placed on the front part of the seat cushion 101, and therefore the weight is applied to the front part.

The second detector 5 may detect, for example, the angle and the position of each of the parts of the passenger P's body. To be more specific, the second detector 5 can detect the relative angle and the relative position of the head, the shoulder, the neck, the waist, the lower back, the hip, the thigh, the knee or the shin of the passenger P. FIGS. 1A-1B illustrate the sitting posture of the passenger P during normal manual driving. Here, the passenger P sits straight. FIG. 1C illustrates another sitting posture of the passenger P, where the upper body of the passenger P on the seat back 102 is inclined backward.

The controller 6 controls the activation of the first activation member 3. To be more specific, when the first detector 4 detects or predicts a collision of the vehicle, the controller 6 controls the first activation member 3 to reel the shoulder belt 21 and stop reeling or unreel the shoulder belt 21, and controls the first activation member 3 to reel the shoulder belt 21 again based on the change in the sitting state detected by the second detector 5. The controller 6 can output activating signals to the first activation member 3. As the controller 6, for example, an ECU which is an in-vehicle processing unit may be used.

FIG. 1C illustrates the passenger protection apparatus 1 when the seat back 102 is inclined backward. In FIG. 1C, the seat back 102 is inclined backward, and accordingly the upper body of the passenger P is inclined backward. Here, the passenger P sits in a position approximately the same as the sitting position illustrated in FIGS. 1A-1B. As the sitting state of the passenger P illustrated in FIG. 1C, the second detector 5 detects that the passenger P sits back on the seat cushion 101 and the upper body is inclined backward. The sitting state illustrated in FIG. 1C during the driving of the vehicle is realized under the automated driving control or the advanced driving support control.

As illustrated in FIGS. 1A-1B, in a case where the passenger P sits straight, when a frontal collision occurs, the lower back and the hip of the passenger P may move downward to sink in the seat cushion 101 once, and move forward. Meanwhile, in a case where the upper body of the passenger P is inclined backward as illustrated in FIG. 1C, when a frontal collision occurs, the lower back and the hip of the passenger P may sink little in the seat cushion 101 and slide on the seat surface to move forward. In particular, when the passenger P sits in the state illustrated in FIG. 1C, the sitting posture is easy to be lost because this sitting state is prone to move the passenger P forward earlier than that illustrated in FIGS. 1A-1B and increase the amount of movement. This prevents the passenger P from being appropriately protected by in-vehicle protection devices such as airbags. That is, when a collision occurs in the case where the passenger P is sits in the state illustrated in FIG. 1C, it is preferred to regulate the sitting state of the passenger P by using the passenger protection apparatus 1.

Next, a control process to regulate the sitting state of the passenger P illustrated in FIG. 1C by using the passenger protection apparatus 1 according to the present example will be described with reference to FIG. 2.

Figure 3A:
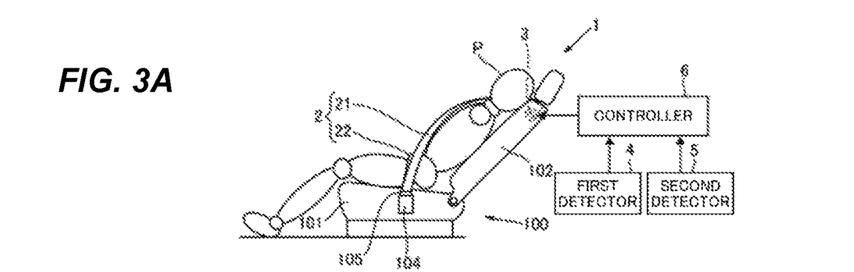
FIGS. 3A-3D illustrate the passenger protection apparatus activated according to the control process illustrated in FIG. 2.

First, as illustrated in FIG. 2, the first detector 4 detects or predicts a collision of the own vehicle (step S1). In the step S1, when the first detector 4 determines that a collision occurs based on the detection result, the step moves to the next step (step S1/YES). In addition, in the step S1, upon detecting another vehicle or an obstacle approaching the own vehicle, the first detector 4 derives a risk due to the approach, and predicts a collision when the risk value exceeds a predetermined threshold. In this case, the step moves to the next step (step S1/YES). Here, when the first detector 4 determines that there is no collision based on the detection result, there is no need to prepare a collision and activate the first activation member 3, and therefore the process is ended (step S1/NO). In addition, when the first detector 4 does not predict a collision because there is no vehicle or obstacle approaching the own vehicle, or when there is a low possibility of a collision because the risk value does not exceed the predetermined threshold although another vehicle or an obstacle approaches the own vehicle, the process is also ended (step S1/NO). The detection result of the first detector 4 is outputted to the controller 6. Before the step 1, that is, during the normal driving under the automated driving control or the advanced driving support control, and during the step 1, the upper body of the passenger P is inclined backward on the seat back 102 as illustrated in FIG. 3A.

Figure 3B:
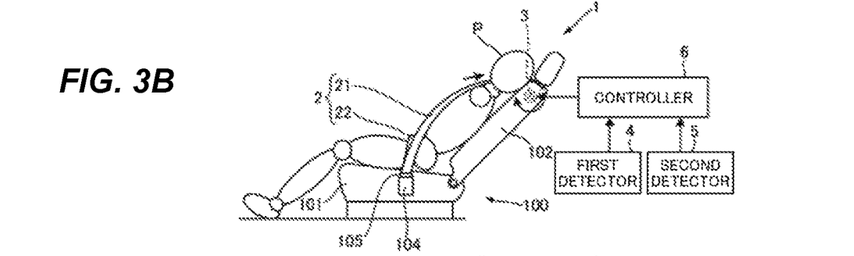

When the first detector 4 detects or predicts a collision (step S1/YES), the controller 6 controls the first activation member 3 to reel the shoulder belt 21 (step S2). In the step S2, when the controller 6 inputs an activating signal to the first activation member 3, the retractor driven by gas or electricity reels the shoulder belt 21 (hereinafter "first reel-ing"). By the first reeling in the step S2, it is possible to regulate the sitting state of the passenger P to place the upper body of the passenger P on the seat 100 in an appropriate position. For example, the upper body of the passenger P may be placed in a position at which the center line of the upper body of the passenger P approximately aligns with the center line of the seat 100 in the seat width direction. If the upper body of the passenger P is shifted to either side in the seat width direction, it is possible to correct the sitting position to the appropriate position or a position close to the approximate position by the first reeling. It is important to first place the upper body of the passenger P in the appropriate position in the seat width direction to prevent an unexpected change in the sitting state of the passenger P, for example, the passenger P is obliquely moved in the front-rear direction of the vehicle after the step 2. By the first reeling in the step S2, the shoulder belt 21 tightly holds the upper body of the passenger P to restrain the upper body of the passenger P on the seat back 102 as illustrated in FIG. 3B.

Figure 3C:
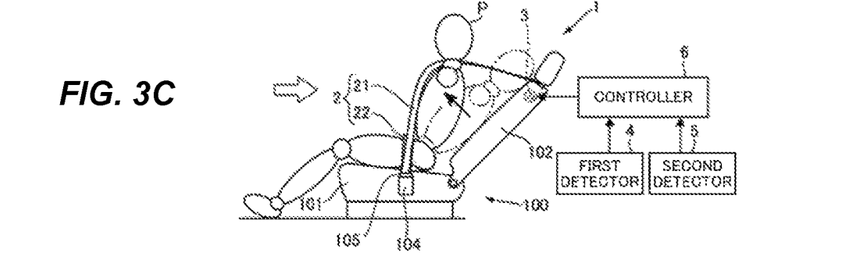

Next, the controller 6 controls the first activation member 3 to stop reeling or unreel the shoulder belt 21 (step S3). In the step 3, when the controller 6 inputs an activating signal to the first activation member 3, the retractor is stopped to stop the first reeling, or the retractor rotates backward to unreel the shoulder belt 21. By stopping the first reeling or unreeling the shoulder belt 21 in the step S3, it is possible to release the upper body of the passenger P from the restraint on the seat back 102. The step 3 allows a change in the sitting state of the passenger P. To be more specific, the inertial force acting forward is applied to the upper body of the passenger P in the collision, so that the upper body of the passenger P is raised as illustrated in FIG. 3C.

Next, the second detector 5 determines whether the degree of change in the sitting state of the passenger P is equal to or greater than a predetermined value (step S4). In the step S4, when the second detector 5 determines that the degree of change in the sitting state of the passenger P (for example, the sitting-up behavior as illustrated in FIG. 3C) is equal to or greater than a predetermined threshold (hereinafter "change threshold") based on the detection result, the step moves to the next step (step S4/YES). Here, the change threshold may be determined for the amount of movement, the movement speed, and the movement acceleration of the upper body of the passenger P. On the other hand, when the second detector 5 determines that a collision has not occurred, or determines that a collision has occurred but the degree of change in the sitting state of the passenger P is smaller than the change threshold, the step S4 is repeated until the degree of change in the sitting state of the passenger P is equal to or greater than the change threshold (step S4/NO). The determination result by the second detector 5 is outputted to the controller 6. Through the step 3 and the step 4, the sitting state of the passenger p can be changed as illustrated in FIG. 3C.

Figure 3D:
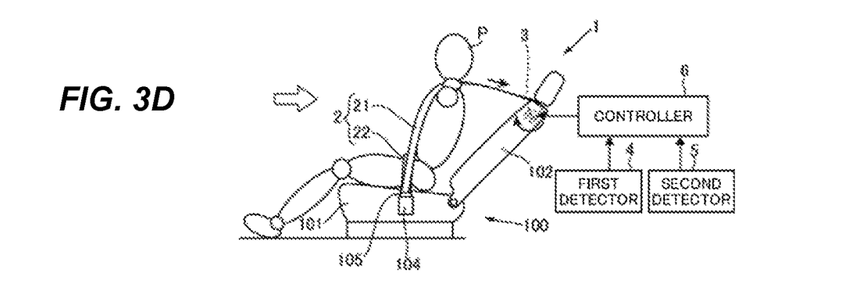

When the second detector 5 determines that the degree of change in the sitting state of the passenger P is equal to or greater than the change threshold (step S4/YES), the controller 6 controls the first activation member 3 to reel the shoulder belt 21 again (step S5). In the step S5, when the controller 6 inputs an activation signal to the first activation member 3, the retractor driven by gas or electricity reels the shoulder belt 21 again (hereinafter "second reeling"). By the second reeling in the step S5, it is possible to regulate the sitting state of the passenger P to prevent the upper body of the passenger P from being changed at a degree greater than that in the step S3. After the step S5, the upper body and the lower body of the passenger P are compelled to significantly move forward due to the impact of the collision, and in-vehicle protection devices such as airbags begin to be activated, and therefore it is necessary to prevent the forward movement of the passenger P. By performing the second reeling in the step 5 as illustrated in FIG. 3D, the shoulder belt 21 can tightly hold the upper body of the passenger P to restrain the upper body of the passenger P on the seat back 102 to prevent the forward movement. By this means, it is possible to regulate the sitting state of the passenger P to prevent a change in the sitting state from the state illustrated in FIGS. 3A-3B and therefore to prevent the lower body of the passenger P from moving forward, so-called "submarining", in a collision.

Therefore, by performing the first reeling, and stopping the first reeling or unreeling the shoulder belt 21, the upper body of the passenger P is raised, and therefore it is possible to prevent the inertial force acting forward that causes the lower body of the passenger P to move forward in a collision. Then, by performing the second reeling, it is possible to substantially fix the sitting state of the passenger P. As a result, it is possible to effectively provide the passenger protection performance of the protection devices to the passenger P.

Here, in FIGS. 3A-3B, the upper body of the passenger P is inclined backward in the same way as FIG. 1C. However, this is by no means limiting, and the passenger protection apparatus 1 can place the passenger P in the appropriate sitting state by performing the same process as in FIG. 2 even though the passenger P sits straight as illustrated in FIGS. 1A-1B. To be more specific, in the state where the passenger P sits straight, when the step 1 of detecting or predicting a collision, the step S2 of performing the first reeling, and the step S3 of stopping the first reeling or unreeling the shoulder belt 21 are performed in the same way, the upper body of the passenger P moves forward, instead of the above-described sitting-up behavior. In this case, the forward movement of the upper body prevents the inertial force acting forward that causes the lower body of the passenger P to move forward after the lower body sinks in the seat cushion 101 in a collision. Moreover, the upper body of the passenger P is restrained on the seat back 102 by the second reeling, and the sitting state is substantially fixed, and therefore it is possible to effectively provide the passenger protection performance of the protection devices to the passenger P.

Therefore, it is possible to make the upper body of the passenger P face the front or the rear of the vehicle, even though the passenger P sits in the state illustrated in FIGS. 1A-1B and FIG. 1C (that is, regardless of the sitting state). This condition where the upper body of the passenger P faces the front or the rear of the vehicle allows the passenger P to be protected by, for example, various types of airbags, as expected.

In a case of an automated driving vehicle or a manual driving vehicle, when the seat belt 2 is activated based on the prediction of a collision, and the collision can be avoided, a step of resetting the seat belt 2 to the default state may be interrupted in the control process by using the passenger protection apparatus 1 illustrated in FIG. 2. To be more specific, when determining that a collision has been avoided, the second detector 5 inputs the determination result to the controller 6. Upon receiving the determination result, the controller 6 stops reeling or unreeling the shoulder belt 21 even though performing any step, and reels or unreels the shoulder belt 21 to reset the seat belt 2 to the default state. By this means, it is possible to place the passenger P in the original sitting state, and therefore to avoid unnecessary restraint of the passenger P.

Figure 4:
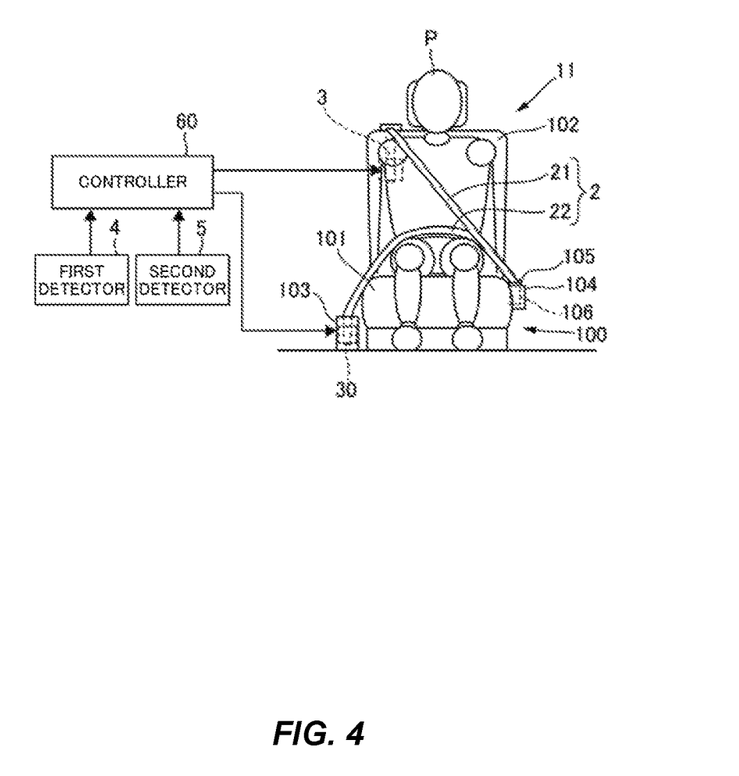
FIG. 4 is a front view schematically illustrating a passenger protection apparatus according to another example of the present invention.
Figure 5:
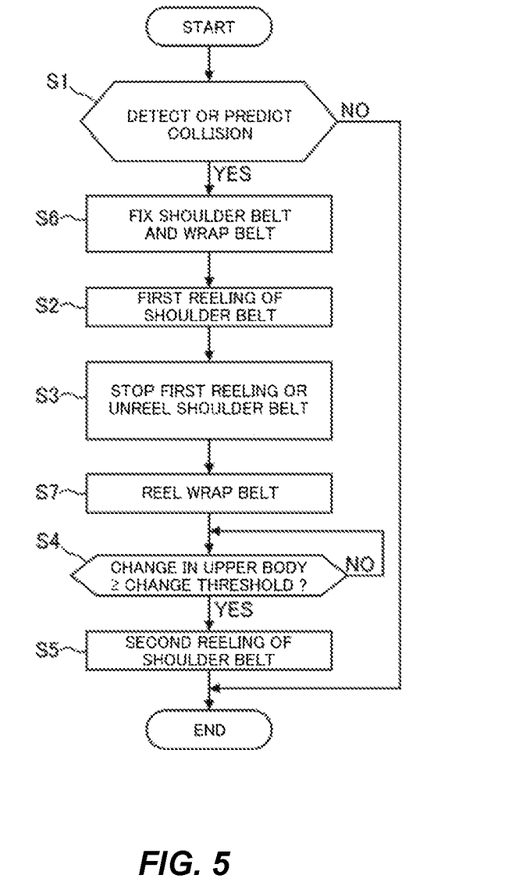
FIG. 5 is a flowchart illustrating a control process to regulate the sitting state of a passenger by using the passenger protection apparatus illustrated in FIG. 4.

Next, an activation member according to another example of the present invention will be described with reference to FIGS. 4 and 5. Here, FIG. 4 is a front view schematically illustrating a passenger protection apparatus 11 according to another example of the present invention. FIG. 5 is a flow chart illustrating a control process to regulate the sitting state of the passenger P by using the passenger protection apparatus 11 illustrated in FIG. 4.

The passenger protection apparatus 11 is different from the passenger protection apparatus 1 illustrated in FIGS. 1A-1C in a second activation member 30 and a regulating member 106. Except about the above-described difference, the components and the steps are the same between them, and therefore redundant description is omitted.

The passenger protection apparatus 11 illustrated in FIG. 4 includes the regulating member 106 provided in the tongue 105. The regulating member 106 is configured to fix and release the shoulder belt 21 and the wrap belt 22 in the tongue 105. The regulating member 106 fixes and releases the shoulder belt 21 and the wrap belt 22 at respective lengths by a mechanical or electrical lock and unlock mechanism which is activated when the shoulder part 21 or the wrap belt 22 is pulled at a predetermined speed or acceleration. When the regulating member 106 is locked to fix the lengths of the shoulder belt 21 and the wrap belt 22, and the shoulder belt 21 is pulled and tightened, the wrap belt 22 is not pulled. In other words, when the regulating member 106 is locked, the division of the seat belt 2 between the shoulder belt 21 and the wrap belt 22 via the tongue 105 is fixed, and therefore one of the shoulder belt 21 and the wrap belt 22 is pulled. As a result, the restraining force of shoulder belt 21 or the wrap belt 22 is locally applied to the passenger P. That is, the regulating member 106 allows the shoulder belt 21 and the wrap belt 22 to individually and locally restrain the body of the passenger P. In a case where the regulating member 106 is unlocked to release the shoulder belt 21 and the wrap belt 22 fixed at the respective lengths, when the shoulder belt 21 is pulled, the wrap belt 22 is also pulled accordingly, and therefore the entire seat belt 2 is pulled and tightened. In other words, in the case where the regulating member 106 is unlocked, when one of the shoulder belt 21 and the wrap belt 22 is pulled, both the shoulder belt 21 and the wrap belt 22 are pulled through the tongue 105 and tightened, and therefore the passenger P is restrained by the entire seat belt 2.

The second activation member 30 reels the wrap belt 22. To be more specific, the second activation member 30 is disposed in the anchor 103, and configured to reel the wrap belt 22 to improve the restraining force of the wrap belt 22 by using a retractor rotationally driven by gas or electricity. With the present example, one end of the seat belt 2 corresponds to one end of the wrap belt 22 which is held by the second activation member 30 in the anchor 103. With the present example, the controller 60 of the passenger protection apparatus 11 controls the second activation member 30 as well as the first activation member 3.

FIG. 5 illustrates a control process by using the passenger protection apparatus 11 including the second activation member 30 and the regulating member 106 described above. Here, in the control process illustrated in FIG. 5, the passenger P sits back on the seat cushion 101 and the upper body is inclined backward in the same way as illustrated in FIG. 3A.

First, the first detector 4 detects or predicts a collision (step S1) in the same way as illustrated in FIG. 2. When the first detector 4 detects or predicts a collision (step S1/YES), the regulating member 106 fixes the shoulder belt 21 and the wrap belt 22 (step S6). In the step S6, the regulating part 106 stops the seat belt 2 from sliding through the tongue 105 to fix the shoulder belt 21 and the wrap belt 22. Here, in a case where the regulating member 106 is electrically activated to fix the shoulder belt 21 and the wrap belt 22, the controller 6 having received an electrical signal indicating the detection result of the step 1 from the first detector 4 may output an activation signal to the regulating member 106. Meanwhile, in a case where the regulating member 106 is mechanically activated to fix the shoulder belt 21 and the wrap belt 22, the regulating member 106 may forcibly grasp or hold the seat belt 2 to stop the seat belt 2 when the seat belt 2 slides through the tongue 105 at a speed equal to or higher than a predetermined speed.

After the step S6 of fixing the shoulder belt 21 and the wrap belt 22, the step S2 of performing the first reeling and the step S3 of stopping the first reeling or unreeling the shoulder belt 21 are performed in the same way as the control process illustrated in FIG. 2. Here, in the step 2 and the step 3, only the shoulder belt 21 is tighten and loosen because the shoulder belt 21 and the wrap belt 22 are fixed at the respective lengths in the step 6 as the previous step. In this case, the restraining force of the wrap belt 22 is constant since the step 6 is performed.

Next, the controller 60 controls the second activation member 30 to reel the wrap belt 22 (step S7). In the step S7, when the second activation member 30 receives an activation signal from the controller 60, the retractor driven by gas or electricity reels the wrap belt 22. By reeling the wrap belt 22 in the step S7, it is possible to increase the restraining force of the wrap belt 22 to restrain the lumbar part and the legs of the passenger P, and therefore to prevent, in particular, the legs of the passenger P from moving forward.

The step S3 allows the upper body of the passenger P to be raised or to move forward, and the step S7 allows lumbar part and the legs of the passenger P to be restrained, and therefore the passenger P is prone to turn about the lumbar part fixed by the wrap belt 22. By this means, the inertial force acting forward to move the passenger P forward can be more easily transformed to the sitting-up behavior or the forward movement of the upper body. As a result, it is possible to more surely prevent the forward movement of the lower body of the passenger P.

Then, the step S4 of determining a change in the sitting state of the passenger P by the second detector 5, and the step S5 of controlling the second reeling by the controller 60 are performed. The shoulder belt 21 is reeled again by the second reeling, and therefore the upper body of the passenger P is tightly held by the shoulder belt 21 to restrain the passenger P so as not to move the passenger P forward. Here, the lumbar part of the passenger P has been restrained since the step S7 of reeling the wrap belt 22 is performed. By this means, it is possible to regulate the sitting state of the passenger P, and therefore it makes it difficult to change the sitting state of the passenger P to move forward any more. As a result, it is possible to prevent the lower body of the passenger P from moving forward, so-called "submarining", in a collision.

In this way, the shoulder belt 21 and the wrap belt 22 are fixed; the first reeling is performed; the first reeling is stopped or the shoulder belt 21 is unreeled; and the wrap belt 22 is reeled. By this means, the upper body of the passenger P is raised to prevent the inertial force acting forward that causes the lower body of the passenger P to move forward in a collision. Moreover, the sitting state of the passenger P is substantially fixed by reeling the wrap belt 22 and performing the second reeling. By this means, it is possible to effectively provide the passenger protection performance of the protection devices to the passenger P.

As described above, with the passenger protection apparatus 1, 11 according to the above described examples illustrated in FIGS. 1A to 5, the first activation member 3, and the second activation member 30 can appropriately reel, unreel or stop reeling the seat belt 2. By this means, it is possible to first place the upper body of the passenger P in the appropriate position, and then allow the upper body of the passenger P to be raised or move forward to prevent the lower body of the passenger P to move forward. Moreover, the shoulder belt 21 is reeled again, so that it is possible to restrain the upper body in the appropriate sitting state. By this means, even though the passenger P sits in any postures in the vehicle under the automated driving control or the advanced driving support control, it is possible to prevent the lower body of the passenger P from moving forward. Therefore, it is possible to maintain the sitting state of the passenger P expected by the protection devices in the vehicle such as airbags and a seat belt, and therefore to prevent the deterioration in the passenger protection performance of the protection devices. Consequently, it is possible to place the upper body and the lower body of the passenger P sitting on the seat 100 in the appropriate positions which allow the airbags to effectively absorb the impact of a collision even though the passenger P sits in any postures.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:
1. A passenger protection apparatus comprising:
    a seat belt comprising a shoulder belt capable of restraining a shoulder of a passenger;
    an anchor disposed on one side of a seat in a seat width direction and configured to hold one end of the seat belt;
    a buckle disposed on the other side of the seat in the seat width direction;
    a tongue capable of holding part of the seat belt extending from the anchor, the tongue being engaged with the buckle;
    a first activation member configured to reel and unreel the shoulder belt;
    a first detector configured to detect or predict a collision of the vehicle;
    a second detector configured to detect a change in a sitting state of the passenger; and
    a controller configured to control activation of the first activation member, wherein:
    when the first detector detects or predicts a collision of the vehicle, the controller controls the first activation member to reel, and stop reeling or unreel the shoulder belt; and
    the controller controls the first activation member to reel the shoulder belt again, on a basis of the change in the sitting state detected by the second detector.
2. The passenger protection apparatus according to claim 1, wherein when the second detector determines that an upper body of the passenger is raised at a degree equal to or greater than a threshold, the controller controls the first activation member to reel the shoulder belt again.

3. The passenger protection apparatus according to claim 1, wherein the sitting state includes at least one of a sitting position and a sitting posture of the passenger.

4. The passenger protection apparatus according to claim 2, wherein the sitting state includes at least one of a sitting position and a sitting posture of the passenger.

5. The passenger protection apparatus according to claim 1, wherein
the seat belt comprises a wrap belt configured capable of restraining a lumbar part of the passenger between the anchor and the buckle,
the passenger protection apparatus further comprises:
a regulating member configured to fix and release the shoulder belt and the wrap belt in the tongue; and
a second activation member configured to reel the wrap belt, the controller controls activation of the second activation member, and
the controller controls the second activation member to reel the wrap belt of the seat belt fixed by the regulating member, while controlling the first activation member to stop reeling or unreel the shoulder belt, and to reel the shoulder belt again.

6. The passenger protection apparatus according to claim 2, wherein
the seat belt comprises a wrap belt configured capable of restraining a lumbar part of the passenger between she anchor and the buckle,
the passenger protection apparatus further comprises:
a regulating member configured to fix and release the shoulder belt and the wrap belt in the tongue; and
a second activation member configured to reel the wrap belt,
the controller controls activation of the second activation member, and
the controller controls the second activation member to reel the wrap belt of the seat belt fixed by the regulating member, while controlling the first activation member to stop reeling or unreel the shoulder belt, and to reel the shoulder belt again.

7. The passenger protection apparatus according to claim 3, wherein
the seat belt comprises a wrap belt configured capable of restraining a lumbar part of the passenger between the anchor and the buckle,
the passenger protection apparatus further comprises:
a regulating member configured to fix and release the shoulder belt and the wrap belt in the tongue; and
a second activation member configured to reel the wrap belt, the controller controls activation of the second activation member, and
the controller controls the second activation member to reel the wrap belt of the seat belt fixed by the regulating member, while controlling the first activation member to stop reeling or unreel the shoulder belt, and to reel the shoulder belt again.

8. The passenger protection apparatus according to claim 4, wherein
the seat belt comprises a wrap belt configured capable of restraining a lumbar part of the passenger between the anchor and the buckle,
the passenger protection apparatus further comprises:
a regulating member configured to fix and release the shoulder belt and the wrap belt in the tongue; and
a second activation member configured to reel the wrap belt,
the controller controls activation of the second activation member, and
the controller controls the second activation member to reel the wrap belt of the seat belt fixed by the regulating member, while controlling the first activation member to stop reeling or unreel the shoulder belt, and to reel the shoulder belt again.

\* \* \* \* \*